June 7, 1960 J. D. DURKEE 2,939,913
SIGNALING TRANSMITTER
Filed Dec. 19, 1957
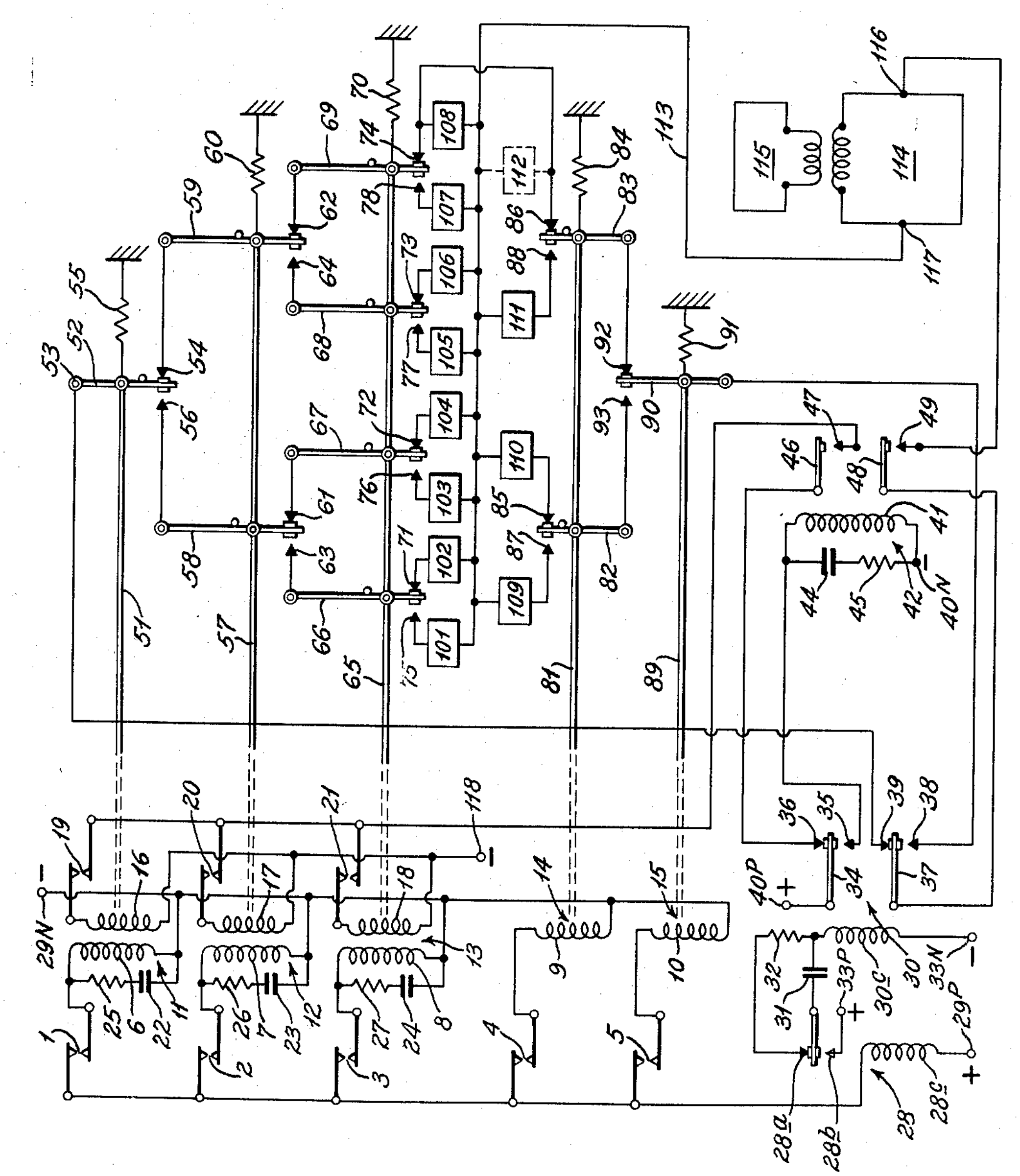
INVENTOR
*James D. Durkee*
BY
*Burns, Doane, Benedict & Irons*
ATTORNEYS

United States Patent Office 2,939,913

Patented June 7, 1960

2,939,913

SIGNALING TRANSMITTER

James D. Durkee, Gravette, Ark., assignor, by mesne assignments, to Bell & Gossett Company, Morton Grove, Ill., a corporation of Illinois Filed Dec. 19, 1957, Ser. No. 703,779

17 Claims. (Cl. 178—66)

This invention relates to an alternate tone transmitter for transmitting functional signals such as the signals used in printing telegraph systems. More particularly, the invention is directed to an improved signaling transmitter wherein each functional intelligible signal transmitted is represented by two distinguishable single frequency tones.

Under the signaling concept of this invention, each intelligible signal to be transmitted is converted into or represented by a conventional five unit code. Thus, each functional intelligible signal, as, for example, each letter of the alphabet, is represented by a unit or combination of units of a five unit code, such as the Baudot code. The five unit code is arbitrarily separated into two components of preferably two elements in one of the components and three elements in the other component.

A matrix is provided for expanding the two-element component by binary progression into a group of four parts. A second matrix expands the three-element component by binary progression into a group of eight parts. Such binary progression has reference to a geometric progression or series wherein the parts progress in relation to one another by a constant factor of two, as, for example, 1, 2, 4, 8.

Individual single frequencies are provided for each part of each group. A single frequency is selected from the four-part group and a single frequency is selected from the eight-part group to form or represent a character or signal. The single frequency selected from the four-part group and the single frequency selected from the eight-part group are individually transmitted in sequence to provide first and second signal phases, each phase consisting of a single frequency.

The five unit code need not be divided into components consisting of two and three elements, although this is preferred and the invention will be thus illustrated and described. The five unit code could be arbitrarily separated into components of one and four elements and in that case the one-element component would be expanded by a matrix into two parts and the four-element component would be expanded by a second matrix into sixteen parts. In either event, the arrangement permits, by combinations of the individual single frequencies, transmission of 32 functional signals.

The system is, strictly speaking, an alternate tone system as distinguished from either a simultaneous tone or sequential tone system. There are many advantages in using my alternate tone system over the systems heretofore used. In the simultaneous tone system a plurality of tones or frequencies are superimposed on each other and are transmitted simultaneously as a composite signal. The total power in the composite signal must be distributed among the number of frequencies or tones constituting the signal. Furthermore, due to selective fading and other atmospheric phenomena, the possibility exists for the loss of power in one or more of the tones constituting the signal. Loss of a component of the simultaneous signal results in erroneous reception.

In a sequential system a plurality of different impulses are transmitted one after the other and the time relationship to each other and to the beginning and end of a series of such impulses is critical to the coding intelligence. In such sequential systems the different impulses must be synchronized or positioned with respect to time in both the transmitter and the receiver in order to permit the series of impulses to accomplish their purpose. This necessity for synchronization of the transmitter and receiver places severe limitations on the rate of transmission and on the compatibility of sequential systems with systems of other types or of different synchronizing rates.

In the alternate tone transmitter of the instant invention, single frequencies or pure tones are transmitted during each signal phase. This greatly reduces the possibility of loss of information in signal transmission and thereby reduces the likelihood of erroneous reception. The transmission of a single frequency at any one time permits the different frequencies to have values relatively close together and the wave band can be rather narrow. In the alternate tone system of this invention, no synchronization with respect to time is required between the transmitter and the receiver. The first phase of the functional intelligible signal is transmitted and followed within a predetermined time period by the second phase of the signal. The first phase of the next succeeding signal may follow immediately the second phase of the preceding signal. The execution of the printing function initiated in the second phase of the signal may be completed during reception of the first phase of the next succeeding signal. Thus, the full time of each signal phase may be utilized for the essential function of determining the intelligence of information contained therein.

The alternate tone signaling transmitter of the instant invention retains compatibility with the existing five unit teleprinter code. In other words, such transmitter can be directly keyed with the existing conventional five unit code keyboard and the received signal can be reconverted into its original five units and used on conventional teleprinters by the use of a suitable converter. Any receiver which will respond to a two phase signal can be used with the signaling transmitter of this invention.

In manual operation of the signaling transmitter keyboard, the operator's timing in actuation of the letter keys may result in actuation of successive keys with very little or negligible time between release of one key to send the signal representing one letter and actuation of the next key to send the signal for the succeeding letter. In other words, the operator's manipulation of the keyboard at the transmitter, particularly at higher sending speeds, may very logically result in the actuated time of the individual keys being comparatively long in relation to the interval between release of one key and actuation of the next succeeding key. To avoid undesirable excessive variation between the lengths of the first and second phases of each signal, the instant invention embodies timing control circuitry to transmit the first and second signal phases for predetermined time periods where timing of the manual operation of the letter keys is such that the keys are held operated with negligible delay between release of one letter key and operation of the next letter key.

It is the primary object of the instant invention to provide an improved signal transmitting system employing representation of each functional intelligible signal by alternate tones with each tone of a single frequency and wherein the second tone, as the second phase of each signal, is transmitted following the first tone and within a predetermined time period following initiation of the first tone of such signal.

It is a further object of this invention to provide an alternate tone transmitting system wherein selection of the tones representative of each functional intelligible signal is effected by operation of one or more of a series of code keys, with the first tone being transmitted as the first signal phase upon such operation and the second tone being transmitted as the second signal phase within a predetermined time period following initiation of such operation, irrespective of the code key or keys being retained in an operated condition.

Other objects and advantages of the instant invention will be more apparent by reference to the following detailed description of an exemplary embodiment of the invention. Such description, as given hereinafter, has reference to the accompanying drawing of a schematic wiring diagram of a transmitter made in accordance with the instant invention. It may be pointed out that the various contacts on the drawing are shown in the positions which they occupy when the relays are not energized.

The reference numerals 1, 2, 3, 4 and 5 designate circuit closing means or switches representative of code keys which may be actuated by letter keys on a keyboard (not shown) such as that illustrated in Durkee Patent No. 2,742,532 entitled "Printer for Communications System." In one mode of operating these keys from a manually actuated keyboard various combinations of the switches 1 through 5 are closed on depression of letter keys of the keyboard.

The reference numerals 6, 7, 8, 9 and 10 designate the individual operating coils of a series of relays which are designated generally by the reference numerals 11, 12, 13, 14 and 15 respectively. The relays 11, 12 and 13 are provided with locking coils 16, 17 and 18 respectively, these locking coils being wound on the same pole pieces as the coils 6, 7 and 8. The relay 11 is provided with contacts 19 which close on energization of the relay for closing a circuit to the locking coil 16. The relays 12 and 13 are similarly provided with contacts 20 and 21 for closing the circuits at the locking coils 17 and 18 respectively.

Relay 11 is provided with a capacitor 22 connected in parallel with its coil 6. Similarly, capacitors 23 and 24 are provided in parallel with coils 7 and 8 of relays 12 and 13 respectively. Resistors 25, 26 and 27 are provided in series connection with the capacitors 22, 23 and 24 respectively to limit the discharge rate of the respective capacitors. As is well recognized, the capacitor-resistor combinations across the coils of relays 11, 12 and 13 serve to retard release of the relays for a predetermined time period following opening of the circuit closing means 1, 2 or 3 by means of which the particular relay was initially energized.

A relay 28 is provided having the operating coil **28*c* connected in series with the switches 1, 2, 3, 4 and 5. The relay 28, switches 1, 2, 3, 4 and 5 and operating coils 6, 7, 8, 9 and 10 of relays 11, 12, 13, 14 and 15 are connected across a voltage source indicated at 29P and 29N. Thus, the relay 28 will be energized when any one of the switches 1 through 5, or any combination of these switches, is closed to energize one or a combination of the relays 11 through 15**, inclusive.

Relay 28 controls the energizing circuit of a relay 30. Thus, the coil **30*c* of relay 30 is connected to the armature of relay 28 through a capacitor 31, and a resistor 32 is provided connected in parallel with capacitor 31 through the upper contacts 28*a* of relay 28. The lower contacts 28*b* of relay 28 are connected to a positive voltage source 33P, while the negative side 33N of such voltage source is connected to the opposite end of coil 30*c* of relay 30**.

Brief mention may be made at this point as to the operation of the energizing circuit for relay 30. In the non-energized state of relay 28, as shown on the drawing, contacts **28*a* are closed such that any charge on capacitor 31 is discharged through resistor 32. Upon energization of relay 28, as effected by closing of one or more of the switches 1 through 5, inclusive, contacts 28*b* close connecting relay coil 30*c* and capacitor 31 in series across voltage source 33P and 33N. As capacitor 31 is charged, the charging current energizes relay coil 30*c* to operate relay 30. When capacitor 31 is charged, current flow through coil 30*c* ceases and relay 30 is thereby deenergized. Upon release of relay 28, its contacts 28*a* close and capacitor 31 is discharged through resistor 32**.

The relay 30 is of the double-pole double-throw type. The armature 34 engages contact 35 when the relay 30 is energized and engages contact 36 when the relay is deenergized. Armature 37 engages contact 38 when the relay 30 is energized and engages contact 39 when the relay is deenergized. Engagement of the contact 35 by the armature 34 causes current to flow from a positive voltage source 40P to the operating coil 41 of a relay which is designated generally by the reference numeral 42. The current passes from the operating coil 41 to a negative voltage source 40N.

A capacitor 44 and a resistor 45 connected in series across coil 41 serve to keep the relay 42 energized for a predetermined time period after the armature 34 has disengaged the contact 35. The armature 46 engages contact 47 when the relay 42 is energized to apply voltage to locking coils 16, 17 and/or 18 if their controlling switches 1, 2 and/or 3 were operated. At the same time energization of relay 42 moves armature 48 into engagement with contact 49 to connect armature 37 of relay 30 to the output circuit of the transmitter.

The reference numeral 51 diagrammatically designates the armature of the relay 11. Contact arm 52 is pivotally mounted at 53 and is urged into engagement with the contact 54 by means of a spring member 55 when the relay 11 is not energized. Energization of the relay 11 causes the contact arm 52 to engage the contact 56. The armature of the relay 12 is designated by the reference numeral 57 and controls contact arms 58 and 59. A spring member 60 urges the contact arm 58 into engagement with the contact 61 and urges the contact arm 59 into engagement with the contact 62 when the relay 12 is not energized. Energization of the relay 12 causes the contact arm 58 to engage the contact 63 and also causes the contact arm 59 to engage the contact 64. The armature of relay 13 is designated by the reference numeral 65 and is used to control contact arms 66, 67, 68 and 69. When the relay 13 is not energized, a spring member 70 urges the contact arms 66, 67, 68 and 69 into engagement with the contacts 71, 72, 73 and 74 respectively. Energization of the relay 13 causes the contact arms 66, 67, 68 and 69 to engage contacts 75, 76, 77 and 78 respectively.

The armature of relay 14 is designated by the reference numeral 81 and is used to control contact arms 82 and 83. When the relay 14 is not energized, a spring member 84 urges the contact arm 82 into engagement with the contact 85 and also urges the contact arm 83 into engagement with the contact 86. Energization of the relay 14 causes the contact arm 82 to engage the contact 87 and causes the contact arm 83 to engage the contact 88. The relay 15 is provided with an armature 89 which controls the position of a contact arm 90. A spring member 91 urges the contact arm 90 into engagement with the contact 92 when the relay 15 is not energized. Energization of the relay 15 causes the contact arm 90 to engage the contact 93.

The reference numerals 101, 102, 103, 104, 105, 106, 107, 108, 109, 110, 111 and 112 designate individual audio-frequency determining elements. These frequency determining elements may be individual audio-oscillators of different frequencies or they may be frequency controlling components of a master audio-oscillator, as will be apparent to those skilled in the art. For purposes of further discussion, it will be assumed that the frequency determining means 101 to 112 are individual oscillators which are connected by means of a common line 113 to an audio-amplifier 114. As indicated above, the numeral 114 may designate a master audio-oscillator whose frequency is determined by the value of frequency determining components corresponding to the individual oscillators 101 to 112. The reference numeral 115 designates a line amplifier or the modulating system of a radio frequency transmitter.

For the purpose of describing the operation of the transmitter, it will be assumed that it is desired to transmit the letter "Y." Depression of the "Y" letter key at the keyboard of the transmitter will close the contacts 1, 3 and 5. Closing of these contacts causes current to flow from the positive voltage source 29P through the coil 28*c* of relay 28 and through the coils 6, 8 and 10 of relays 11, 13 and 15 to the negative voltage source 29N. Current flowing through operating coil 6 energizes relay 11, closing contacts 19 and causing contact arm 52 to engage contact 56. Current flowing through operating coil 8 of relay 13 closes contacts 21 and causes contact arms 66, 67, 68 and 69 to engage contacts 75, 76, 77 and 78 respectively. Current flowing through operating coil 10 energizes relay 15 and causes contact arm 90 to engage contact 93.

The flow of current through coil 28*c* energizes relay 28 thereby closing its contacts 28*b* and opening its contacts 28*a*. Capacitor 31 and coil 30*c* of relay 30 are thereby connected across voltage source 33P—33N. The charging current for capacitor 31 effects energization of relay 30 during the charging time, causing armature 34 to engage contact 35 and armature 37 to engage contact 38. Engagement of contact 35 by armature 34 causes the relay 42 to be energized to engage armature 46 with contact 47 and to engage armature 48 with contact 49.

Under the circuit conditions outlined above, the first phase of the "Y" signal will be transmitted as the individual frequency of the oscillator 110. The circuit for transmission of the first signal phase can be traced as follows: From the input terminal 116 of the audio-amplifier 114 to the contact 49, the armature 48, the armature 37, the contact 38, contact arm 90, contact 93, contact arm 82, contact 85, oscillator 110, and common return line 113 to the terminal 117 of the audio-amplifier 114.

During this first phase of the signal the oscillator 110 is the only oscillator which is connected to the audio-amplifier 114. None of the oscillators 101 to 108 are connected to the audio-amplifier because of the fact that the armature 37 is not in engagement with the contact 39. The oscillators 109, 111 and 112 are not connected with the audio-amplifier because of the positions of the contact arms 82, 83 and 90.

Upon capacitor 31 becoming charged, current flow through coil 30*c* ceases and relay 30 is immediately deenergized. Such deenergization of relay 30 occurs even though the "Y" key may be held operated with switches 1, 3 and 5 still closed. It will be appreciated that should the "Y" key be released before complete charging of capacitor 31 is effected, relay 30 will be immediately deenergized by contacts 28*b* of relay 28 opening to interrupt the connection with positive voltage source 33P.

Even though the "Y" key is held in actuated condition to retain switches 1, 3 and 5 closed, the relay 30 will remain energized for only a predetermined period of time as determined by the charging time for capacitor 31. Upon deenergization of relay 30, armature 34 engages contact 36. Capacitor 44 and resistor 45 prevent relay 42 from being immediately deenergized as armature 34 breaks contact between source 40P and contact 35. Current then flows from the positive voltage source 40P through the armature 34, contact 36, armature 46, and contact 47 to the closed contacts 19 and 21 and through the locking coils 16 and 18 to the source of negative voltage 118. Contacts 19 and 21 are closed either by continued operation of switches 1 and 3, or for a predetermined time period after release of these switches by the release delay provided by the resistor-capacitor combinations across coils 6 and 8.

The circuit is then in condition for transmission of the second phase of the signal. The second phase of the signal consists of the individual frequency of oscillator 103. The circuit during the second phase of the signal may be traced from the input terminal 116 of the audio-amplifier 114 through the contact 49, armature 48, armature 37, contact 39 to contact arm 52, contact 56, contact arm 58, contact 61, contact arm 67, contact 76, oscillator 103 and return line 113 to the terminal 117 of the audio-amplifier 114.

The oscillator 103 is the only oscillator which is connected to the audio-amplifier 114 during the second phase of the signal. The second phase of the signal will persist until the energy stored in the capacitor 44 is dissipated, permitting relay 42 to be deenergized to separate armature 48 from contact 49, or until the first phase of a new signal begins through depression of another key of the keyboard.

It will be understood that the frequency of oscillator 110 represents the code element corresponding to contacts 5 and that the frequency of oscillator 103 is representative of the combination of code elements corresponding to contacts 1 and 3.

In accordance with the hereinabove set forth example, where the "Y" key is manually held in an engaged position longer than the charging time for capacitor 31, relay 30 will be deenergized and the second signal phase is transmitted through engagement of armature 37 with contact 39. It will be further apparent that should the "Y" key be released within a time following its initial actuation less than the charging time of capacitor 31, relay 30 will be immediately deenergized and the second signal phase transmitted. In such event, the resistor-capacitor combinations across the coils 6 and 8 will retain relays 11 and 13 energized until the locking coils 16 and 18 are energized so that the selected frequency tone of oscillator 103 will be transmitted as the second signal phase.

Whether release of the "Y" key or complete charging of capacitor 31 causes the second signal phase to be transmitted, the duration of transmission of such signal phase will be determined by the resistor-capacitor combinations across the coil 41 of relay 42, which will retain such relay in an energized state for a predetermined time period against release of its armatures 46 and 48. By engagement of armature 46 with contact 47 the locking coils 16 and 18 of relays 11 and 13 will be energized to hold such relays in closed position, and armature 48 engaging contact 49 will complete the circuit for transmission of the second phase signal.

For purposes of further illustration, let it be assumed that it is desired to transmit the letter "H." The depression of the "H" key will cause switches 1 and 3 to be closed. The first phase of the signal would normally consist of the frequency of the oscillator 112 and the second phase of the signal would consist of the frequency of the oscillator 103. However, a frequency designated as zero can be used in either phase of the signal and oscillator 112 could be eliminated, in which case the first phase of the "H" signal would consist of the zero designated frequency. If the oscillator 112 is retained as the frequency designated as zero, oscillator 108 could be eliminated or vice versa.

It will now be clear that by the various combinations of the five elements of the teleprinter code the 31 characters of that code can be transmitted as alternate tone signals. The first phase or tone of the signal represents a combination of code elements corresponding to switches 4 and 5 and the second tone or signal phase represents a combination of code elements corresponding to switches 1, 2 and 3. While the five unit code has been illustrated as having been arbitrarily separated into a first component consisting of code units corresponding to switches 4 and 5 and a second component consisting of code units corresponding to switches 1, 2 and 3, it is contemplated that the separation may be made in other ways. For example, the first component might consist of a single code unit and the second component would then consist of four code units. The illustrated embodiment is, however, preferred since this arrangement permits use of the smallest number of individual oscillators or other frequency determining means.

Each of the oscillators 101 to 111 (and oscillator 112, if present) have their own individual frequency, and each frequency is different from every other frequency. The first phase of the signal is a single frequency which is different from any other frequency transmitted by the apparatus. Similarly, the second phase of the signal is a single frequency which is different from any other frequency which is transmitted. The use of single frequencies in this manner eliminates the sending of complex tones and reduces the likelihood of errors or losses in transmission. The receiver will, of course, be capable of distinguishing between the frequencies which are used in the first phase of the signal and those which are used in the second phase, and there is no need for synchronism of the receiver with the transmitter. Thus, at a suitable receiver, tuned frequency responsive devices, one sensitive to each of the individual frequencies of the transmitter, are provided whereupon one of such devices will respond to the frequency tone of a first signal phase and a second of such devices will respond to the frequency tone of the second signal phase, the combined response of these two devices at the receiver being indicative of the particular functional signal transmitted by the transmitter. The details of the receiver form no part of the invention of this application.

The first phase of the signal, in accordance with the instant invention, will persist as long as a key is kept depressed or for the charging time of capacitor 31 in the event of the key being depressed for a period of time longer than such charging time. The second phase of the signal will persist until another key is depressed or until the energy in the capacitor 44 of the relay 42 is dissipated. Any convenient time interval may be permitted to elapse between the second phase of one signal and the first phase of the next subsequent signal. This arrangement permits transmission at any desired speed and the speed of transmission need not be constant.

There has been illustrated and described what is now considered to be the preferred embodiment of the invention. It will be understood, however, that various modifications may be used without departing from the broader scope of the invention which is defined by the following claims.

Having thus described my invention, I claim:

1. Apparatus for sending an alphabetical signal by means of an alternate two-tone signal, each tone of which consists of a single frequency, comprising means for representing the alphabet as a five-unit code, a first matrix for expanding two units of said code by binary progression into a group of four parts, a second matrix for expanding the remaining three units of said code by binary progression into a group of eight parts, individual single frequency-determining means for each of said parts of each group, first relay means responsive to said two units of said code for selecting through said first matrix a single frequency from said group of four parts, second relay means responsive to the remaining three units of said code for selecting through said second matrix a single frequency from said group of eight parts, and means for first sending one of the thus selected frequencies as a first signal tone and for thereafter sending the other of said selected frequencies as a second signal tone.

2. Apparatus for sending an intelligible functional signal by means of an alternate two-tone signal, each tone of which consists of a single frequency, comprising means for representing the signal to be transmitted as a five-unit code, a first matrix for expanding two units of said code by binary progression into a group of four parts, a second matrix for expanding the remaining three units of said code by binary progression into a group of eight parts, individual single frequency determining means for each of said parts of each group, first relay means responsive to said two units of said code for selecting through said first matrix a single frequency from said group of four parts, second relay means responsive to the remaining three units of said code for selecting through said second matrix a single frequency from said group of eight parts, and means for first sending one of the thus selected frequencies as a first signal tone and for thereafter sending the other of said selected frequencies as a second signal tone.

3. Apparatus for sending an alphabetical signal by means of an alternate two-tone signal, each tone of which consists of a single frequency, comprising means for representing the alphabet as a five-unit code, a first matrix for expanding a first component consisting of at least one unit of said code by binary progression into a first group of parts, a second matrix for expanding a second component consisting of the remaining units of said code by binary progression into a second group of parts, individual single frequency determining means for each of said parts of each group, first relay means responsive to said first component of units of said code for selecting through said first matrix a single frequency from said first group of parts, second relay means responsive to the second component or units of said code for selecting through said second matrix a single frequency from said second group of parts, and means for first sending one of the thus selected frequencies as a first signal tone and for thereafter sending the other of said selected frequencies as a second signal tone.

4. Apparatus for transmitting functional signals, comprising means for representing such functional signals as a five-unit code, a first matrix for expanding a first component consisting of at least one unit of said code by binary progression into a first group of parts, a second matrix for expanding a second component consisting of the remaining units of said code by binary progression into a second group of parts, individual frequency determining means for each of said parts of each group, first relay means responsive to said first component of units of said code for selecting through said first matrix a single individual frequency from said first group of parts, second relay means responsive to said second component of units of said code for selecting through said second matrix a single individual frequency from said second group of parts, and means for first sending one of the thus selected individual frequencies as the first phase of a signal and for thereafter sending the other thus selected individual frequency as the second phase of such signal.

5. Apparatus for sending an intelligible functional signal by means of an alternate two-tone signal, each tone of which consists of a single frequency, comprising means for representing the signal to be transmitted as a five-unit code, a first matrix for expanding two units of said code by binary progression into a group of four parts, a second matrix for expanding the remaining three units of said code by binary progression into a group of eight parts, individual single frequency determining means for each of said parts of each group, first relay means responsive to said two units of said code for selecting through said first matrix a single frequency from said group of four parts, second relay means responsive to the remaining three units of said code for selecting through said second matrix a single frequency from said group of eight parts, a signal emitter, and third relay means in series connection with said first and second relay means, said third relay means being operative, upon energization, to connect the selected single frequency from one of said groups to said signal emitter and, upon deenergization, to connect the selected single frequency from the other group to said signal emitter to thereby send an alternate two-tone signal, and means for preventing deenergization of the said relay means effecting selection from said other group during the sending of the second tone of such signal.

6. A system for sending an alternate two-tone signal in which the first signal phase includes one of a first group of different frequencies and the second signal phase includes one of a second group of different frequencies, said system comprising a signal emitter, first and second relay means operative upon energization to substantially simultaneously select respectively a frequency from said first group and a frequency from said second group, and third relay means in series connection with said first and second relay means operative, upon energization, to impress only the selected frequency from said first group on said signal emitter for the first signal phase and, upon deenergization of said third relay means, to impose only the selected frequency from said second group on said signal emitter for the second signal phase, and means for preventing deenergization of said second relay means during the second signal phase.

7. An alternate two-tone signal transmitter comprising a first group of tone generators, a second group of tone generators, an amplifier, first relay means energizable to select a tone generator from said first group, second relay means energizable to select a tone generator from said second group, third relay means in series with said first and second relay means, said third relay means, upon energization, connecting the selected tone generator of said first group with said amplifier to transmit the first tone of the signal and, upon de-energization, connecting the selected tone generator of said second group with said amplifier to transmit the second tone of the signal, and means preventing deenergization of said second relay means for a time interval after deenergization of said third relay means to thereby maintain said selection of the tone generator of said second group during transmission of the second tone of the signal.

8. Apparatus for sending an intelligible functional signal by means of an alternate two-tone signal, each tone of which consists of a single frequency, comprising means for representing the functional signals to be transmitted as a five-unit code including individual circuit closing means representative of each unit of the code, a series of individual frequency determining means, two of said circuit closing means being coupled to said series of frequency determining means to select a first single frequency therefrom as determined by the circuit closing means operated, the remaining three of said circuit closing means being coupled to said series of frequency determining means to select a second single frequency therefrom as determined by the circuit closing means operated, relay means connected in series with said circuit closing means operable upon closing of at least one of said circuit closing means to send only the selected first frequency as the first tone of the functional signal and upon opening of all of said circuit closing means to send the selected second signal frequency as the second tone of the functional signal.

9. Apparatus for sending an intelligible functional signal as recited in claim 8 wherein delay means are provided for retaining the selection of said second single frequency after opening of all of said circuit closing means for sending said second frequency as the second tone of the functional signal.

10. A system for sending an alternate two-tone signal having two phases in which the first signal phase includes one of a first plurality of frequencies and the second signal phase includes one of a second plurality of frequencies, said system comprising a signal emitter, a keyboard, first and second electric circuit means connected for actuation by said keyboard and operative, upon energization, to substantially simultaneously select respectively a frequency for the first phase and a frequency for the second phase, third electric circuit means connected for energization upon actuation by said keyboard and operative, upon energization, to impress the selected first-phase frequency on said signal emitter and, upon deenergization, to impress the selected second-phase frequency on said signal emitter, and means actuated by said third electric circuit means and operative, upon energization, for maintaining said second electric circuit means energized for a limited time following deenergization of said third electric circuit means.

11. A system for sending an alternate two-tone signal having two phases in which the first signal phase includes one of a first plurality of frequencies and the second signal phase includes one of a second plurality of frequencies, said system comprising a signal emitter, a keyboard, first and second electric circuit means connected for actuation by said keyboard and operative, upon energization, to substantially simultaneously select respectively a frequency for the first phase and a frequency for the second phase, said second electric circuit means including circuit-holding means effective to maintain the operative condition of said second electric circuit means a limited time following the termination of sustained actuation thereof, third electric circuit means connected for energization upon actuation by said keyboard, and fourth electric circuit means energized in response to energization of said third electric circuit means and including circuit-holding means effective to maintain the energized condition of said second and fourth electric circuit means a limited time following deenergization of said third electric circuit means, said third and fourth electric circuit means being cooperably connected to impress the selected first-phase frequency on said signal emitter when both said third and fourth electric circuit means are energized and, upon deenergization of said third electric circuit means to impress the selected second-phase frequency on said signal emitter so long as said fourth electric circuit means remains energized.

12. A system for sending an alternate two-tone signal having two phases in which the first signal phase includes one of a first group of different frequencies and the second signal phase includes one of a second group of different frequencies, said system comprising a signal emitter, a keyboard, first and second electric circuit means connected for actuation by said keyboard and operative, upon energization, to substantially simultaneously select respectively a frequency from said first group and a frequency from said second group, said second electric circuit means including circuit-holding means effective to maintain the operative condition of said second electric circuit means a limited time following the termination of sustained actuation thereof, third electric circuit means connected for energization upon actuation by said keyboard, and fourth electric circuit means energized in response to energization of said third electric circuit means and including circuit-holding means effective to maintain the energized condition of said second and fourth electric circuit means a limited time following deenergization of said third electric circuit means, said third and fourth electric circuit means being cooperably connected to impress the selected first-phase frequency on said signal emitter when both said third and fourth electric circuit means are energized and, upon deenergization of said third electric circuit means, to impress the selected second-phase frequency on said signal emitter so long as said fourth electric circuit means remains energized.

13. Apparatus for sending an intelligible functional signal by means of an alternate two-tone signal, each tone of which consists of a single frequency, comprising a keyboard, means for representing the functional signals to be transmitted as a multiple-unit code including individual circuit-closing means representative of each unit of the code and controlled by said keyboard, a series of individual frequency-determining means, at least one of said circuit-closing means being coupled to said series of frequency-determining means to select a first single frequency therefrom as determined by the circuit-closing means operated by said keyboard, the remainder of said circuit-closing means being coupled to said series of frequency-determining means to select a second single frequency therefrom as determined by the circuit-closing means operated by said keyboard, and electric circuit means operable upon momentary actuation of said keyboard to send only the selected first frequency as the first tone of the functional signal and thereafter to send only the selected second signal frequency as the second tone of the functional signal.

14. The arrangement of claim 4 wherein said apparatus includes control means automatically operable in conjunction with the last-named means thereof to terminate sending of the first phase of said signal and to cause sending of the second phase of said signal within a predetermined time period following initiation of sending the first phase of said signal.

15. The arrangement of claim 10 wherein said system includes control means automatically operable in conjunction with said third electric circuit means thereof to terminate sending of the first-phase frequency and to cause sending of the second-phase frequency within a predetermined time period following actuation of said key-board irrespective of continued actuation of said key-board maintaining energization of said third electric circuit means.

16. The arrangement of claim 11 wherein said system includes control means automatically operable in conjunction with said third electric circuit means thereof to terminate sending of the first-place frequency and to cause sending of the second-phase frequency within a predetermined time period following actuation of said keyboard irrespective of continued actuation of said keyboard maintaining energization of said third electric circuit means.

17. The arrangement of claim 13 wherein said electric circuit means thereof includes signal-phase selecting means operative, upon energization, to effect sending of the said first frequency and, upon deenergization, to effect sending of the said second frequency, capacitor means series-connected in the energizing circuit of said signal-phase selecting means to cause deenergization of said signal-phase selecting means after a predetermined time period represented by the charging time for the capacitor, and means operable to initiate charging of said capacitor means through said selecting means upon selection of the first and second-phase individual frequencies.

References Cited in the file of this patent

UNITED STATES PATENTS

| | | |
|---|---|---|
| 1,805,867 | Compare | May 12, 1931 |
| 2,658,942 | Durkee | Nov. 10, 1953 |